Nov. 21, 1944.  W. P. McDORMAN  2,363,188
CHEMISTRY
Filed Sept. 25, 1940  2 Sheets-Sheet 1

William P. McDorman INVENTOR.
BY Spencer Hardman
ATTORNEYS

Nov. 21, 1944.   W. P. McDORMAN   2,363,188
CHEMISTRY
Filed Sept. 25, 1940   2 Sheets-Sheet 2

William P. McDorman INVENTOR.
BY Spencer Hardman and Fehr
ATTORNEYS

Patented Nov. 21, 1944

2,363,188

UNITED STATES PATENT OFFICE 2,363,188

CHEMISTRY

William Paullin McDorman, Dayton, Ohio, assignor to General Motors Corporation, Dayton, Ohio, a corporation of Delaware Application September 25, 1940, Serial No. 358,340

3 Claims. (Cl. 210—183)

This invention relates to chemistry and more particularly to filtering means and a method of filtering for reclaimed paint and general filtering purposes.

I have found that ordinary filtering devices clog readily. I believe this to be partly due to the fact that both sides of the filter are not kept flooded or wetted and partly due to the fact that no means are provided for preventing the accumulation of solid upon the filter.

It is an object of my invention to provide an improved filtering device in which clogging is eliminated.

It is another object of my invention to provide an improved filtering device in which both sides of the filter are kept flooded or wetted.

It is another object of my invention to provide an improved filtering device in which an agitating means is provided for agitating the material to prevent clogging.

It is still another object of my invention to provide an improved filtering device in which both sides of the filter are kept wetted or flooded together with an agitating means for agitating the material to prevent clogging.

It is another object of my invention to provide a filtering arrangement in which several of my improved filtering devices are connected in series beginning with a coarse filter and ending with a fine filter.

It is another object of my invention to provide a method of filtering wherein clogging of the filter is prevented.

Further objects and advantages of the present invention will be apparent from the following description, reference being had to the accompanying drawings, wherein a preferred form of the present invention is clearly shown.

Briefly, I have shown a filtering device made of an inner and outer receptacle with the inner receptacle having its walls formed of a fine mesh filter screen. An overflow type outlet is provided for keeping both receptacles flooded with the material being filtered. A paddle is rotated within the inner receptacle in order to agitate the material being filtered so as to remove the solid material from the screen and keep it in suspension.

Figure 1:
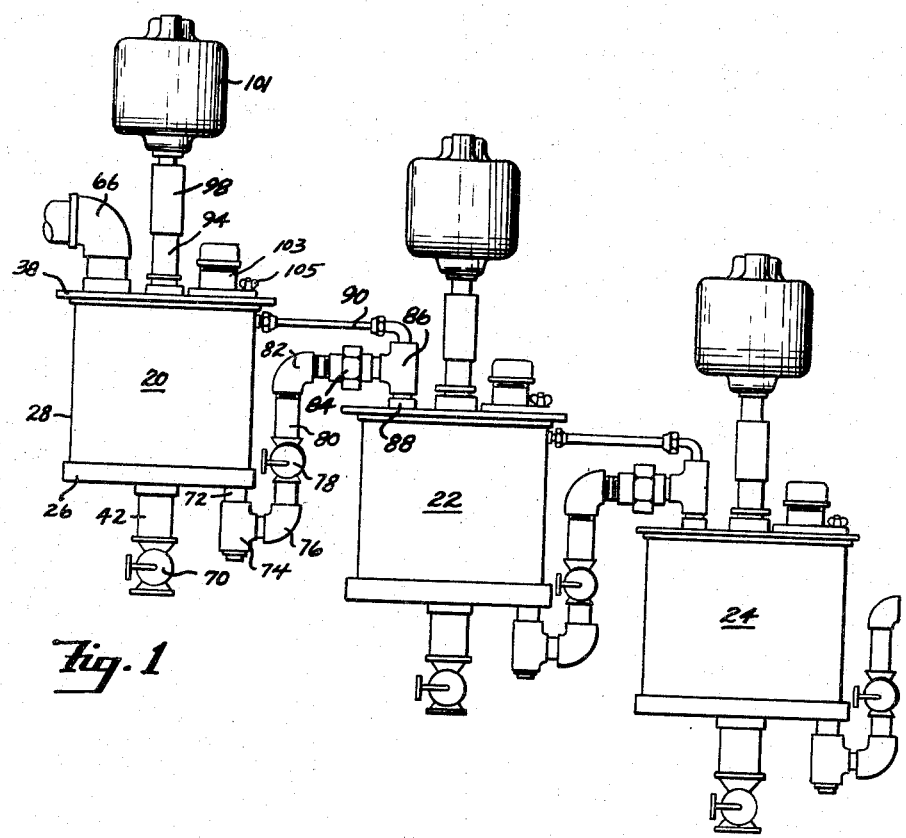
Fig. 1 is a view in elevation of my improved filtering arrangement showing three filtering devices connected in series.
Figure 2:
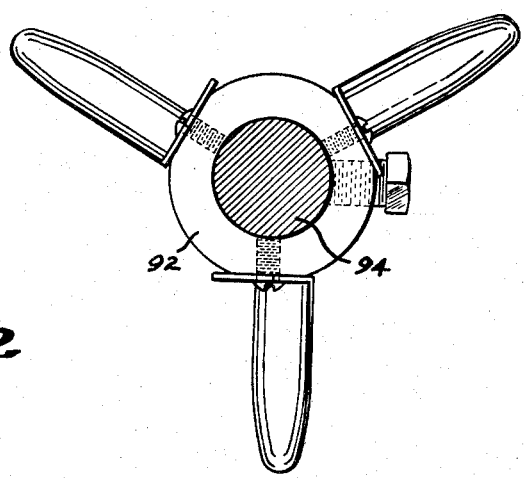
Fig. 2 is a top view of the paddle of the agitating means.
Figure 3:
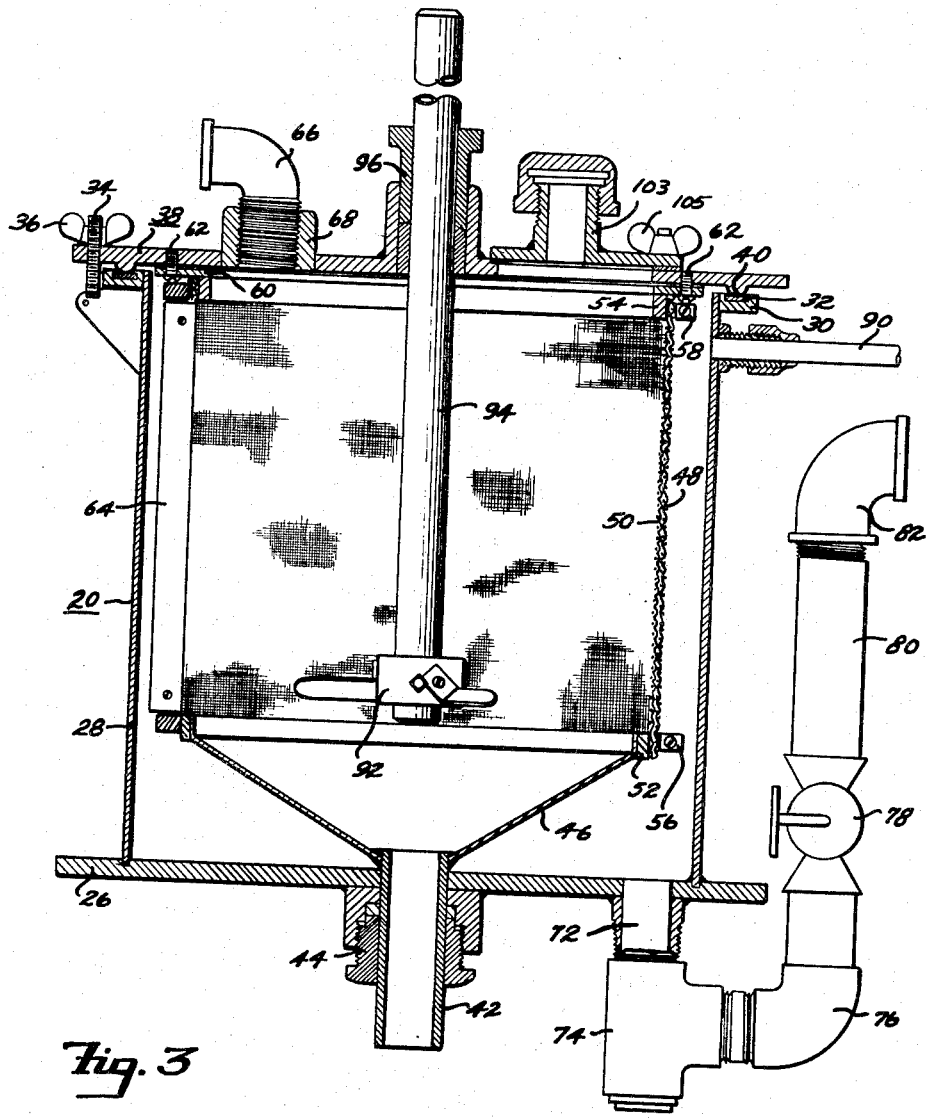
Fig. 3 is a vertical sectional view through one of the filtering devices shown in Fig. 1.

Referring now to the drawings and more particularly to Fig. 1 there is shown a filtering arrangement in which the filtering devices 20, 22 and 24 are connected in series. The details of each of these devices are shown in Fig. 3 which is a sectional view of the filtering device 20. This device includes an outer receptacle formed of a bottom plate 26 and a vertical cylinder 28 which rests upon and has its lower edge welded to the upper surface of the bottom plate 26. The top of the cylinder 28 is provided with a ring 30 which receives an annular gasket 32. Also, welded to the cylinder 28 are the swivel screws 34 provided with wing nuts 36 for fastening the top cover or lid 38 onto the cylinder 28. This lid 38 is provided with an annular projection 40 which enters into sealing engagement with the gasket 32 in order to seal the outer receptacle.

The bottom plate 26 is provided with a central aperture which receives a tube 42. The bottom plate 26 is also provided with a packing gland 44 for sealing the tube 42 in the aperture. The upper end of this tube 42 connects to the flared bottom 46 of the inner receptacle. Two filtering screens are employed. The outer filtering screen 48 is of a close heavy mesh and is used only for supporting the inner screen 50. These screens are made cylindrical in shape and are wrapped around a lower ring 52, provided upon flared bottom 46, and an upper ring 54. A clamping ring 56 clamps the lower edge of the screens upon the ring 52 while a clamping ring 58 clamps the upper edge of the screens to the ring 54. The ring 54 makes a substantially tight fit with the ring 60 which is fastened by screws to the lid 62. The screens may be made in one or more sections which have their ends clamped together in order to seal the joint between the ends of the sections. One set of these clamps 64 is clearly shown in Fig. 3. Where the screens are made of a single rectangular piece, only one set of clamps is required. When more pieces are used, more sets of clamps are required.

In the particular embodiment shown, the material to be filtered is introduced through the elbow 66 which is threaded into a threaded flanged opening 68 in the cover 38. This introduces the material into the inner receptacle which includes the screens 48 and 50. The tube 42 is closed at its lower end by a hand valve 70. Normally, the liquid which filters through the screens would be drawn off as fast as it accumulates. However, in my improved invention, I keep the outer receptacle flooded with the liquid which passes through the screens. In order to do this, I provide an outlet 72 in the bottom plate 26 to which is connected a T 74 which is plugged at its lower end and connected on the side to an elbow 76 which in turn connects to a hand valve 78. The hand valve 78 is connected by a pipe section 80 to an elbow 82 which in turn connects to the union 84. The union 84 then connects to a T 86 which is connected to the inlet 88 for the filtering device 22. The top of the T 86 is connected by tubing 90 to the upper portion of the outer receptacle 26 in order to prevent the goose-neck type connection between the filtering device from becoming a syphon.

Thus, by this arrangement the level of liquid which is filtered through the screens is always maintained up to the level of the upper portion of the goose-neck connection. I find that this arrangement aids materially in preventing clogging of solid material upon the screen 50.

In order to further prevent this clogging, I provide an agitating means including a three-bladed paddle 92 provided at the bottom of an agitating shaft 94 within the inner receptacle. This shaft extends through a packing gland 96 provided in the cover 38 and the upper end of the shaft 94 is connected by a sleeve 98 to an agitator means 101 for driving the paddle. Any suitable form of bearing support may be provided for the shaft 94 and the sleeve 98. By operating the three-bladed paddle 92 within the lower portion of the inner receptacle, sufficient movement of the material to be filtered within the inner receptacle is provided to carry away solids from the screen 50 before the screen is solidly clogged. If the opposite side of the screen were not flooded, I do not believe that the agitating means would be able to remove the solid material from the screen 50 because the liquid head would tend to keep the solid material on the screen. Since the outside of the screen is flooded, this liquid head is eliminated and the tendency to clog is reduced and the agitating means can readily remove by circulation any solid material which might tend to collect upon the screen 50. This solid material thus remains in suspension within the inner receptacle and accumulates therein. When the material within the inner receptacle becomes too thick, it may be removed by opening the valve 70 after which a fresh supply of filterable material may then be introduced. A hand-hold with a removable cover 103 is provided in the large cover 38 and is fastened in place normally by the wing nuts 105.

For many purposes, it is desirable to connect two or three of such filtering devices in series as shown in Fig. 1. In such an arrangement all of the filters are the same, except possibly in size and in the fineness of the screens or filter material used.

While I prefer the filtering arrangement described in detail, it is possible to use other arrangements. For example, the material to be filtered might be introduced into the outer receptacle and the liquid removed from the inner receptacle. The agitating means might be located in either arrangement between the inner and outer receptacles instead of within the inner receptacle. It is also possible for the agitating means to agitate the screens instead of directly agitating the material.

I find that this filtering device will operate for a much longer time without any clogging difficulties than other types of filters with which I am acquainted. I have found that this filtering device is excellent for filtering reclaimed paint as well as for filtering other materials.

While the form of embodiment of the invention as herein disclosed, constitutes a preferred form, it is to be understood that other forms might be adopted, all coming within the scope of the claims which follow.

What is claimed is as follows:

1. A filtering device comprising an inner receptacle having wall portions of filter material, a confining wall portion surrounding and spaced from said wall portions of filter material for receiving any liquid which passes through the filter material, overflow type outlet means for maintaining a level of filtered liquid in said space between the wall portion of filter material and the confining wall portion sufficient to keep the major portion of both sides of the filter material in a wetted condition and for removing the surplus of filtered liquid, an inlet entering said receptacle at a level above the level maintained by said overflow type outlet means, and mechanical agitating means located within said receptacle for mechanically agitating the liquid mixture to be filtered within said receptacle.

2. A filtering device comprising an inner reception tacle having wall portions of filter material, a confining wall portion surrounding and spaced from said wall portions of filter material for receiving any liquid which passes through the filter material, overflow type outlet means for maintaining a level of filtered liquid in said space between the wall portion of filter material and the confining wall portion sufficient to keep the major portion of both sides of the filter material in a wetted condition, an inlet entering said receptacle at a level above the level maintained by said overflow type outlet means, mechanical agitating means located within said receptacle for mechanically agitating the liquid mixture to be filtered within said receptacle, and an outlet located in the bottom of said receptacle.

3. A filtering device comprising an inner receptacle having wall portions of filter material, a confining wall portion surrounding and spaced from said wall portions of filter material for receiving any liquid which passes through the filter material, overflow type outlet means for maintaining a level of filtered liquid in said space between the wall portion of filter material and the confining wall portion sufficient to keep the major portion of both sides of the filter material in a wetted condition and for removing the surplus of filtered liquid, an inlet entering said receptacle through which the liquid mixture to be filtered may be supplied to said receptacle, and mechanical agitating means located within said receptacle for mechanically agitating the liquid mixture to be filtered to said receptacle.

WILLIAM PAULLIN McDORMAN.